United States Patent

Van Etten

[15] 3,678,865

[45] July 25, 1972

[54] CARGO BOLSTER

[72] Inventor: Wallace D. Van Etten, Star Rte. Box 517, Eustis, Fla. 32726

[22] Filed: March 16, 1970

[21] Appl. No.: 19,658

[52] U.S. Cl..........................105/369 B, 105/367, 105/369 S
[51] Int. Cl. .....................................B61d 45/00, B60p 7/10
[58] Field of Search ..........................105/367, 369 B, 369 S; 214/10.5; 264/51, 54; 116/63 R, 63 P; 206/23; 220/97 C; 229/14 C

[56] References Cited

UNITED STATES PATENTS

| | | | |
|---|---|---|---|
| 3,485,202 | 12/1969 | Platt | 116/63 P |
| 3,495,733 | 2/1970 | Davis | 220/97 C |
| 2,498,804 | 2/1950 | Goff | 105/367 |
| 2,580,224 | 12/1951 | Grazier | 105/367 |
| 2,839,198 | 6/1958 | Lefevre | 214/10.5 |
| 3,494,301 | 2/1970 | Sause, Jr. | 105/369 B |

*Primary Examiner*—Drayton E. Hoffman
*Attorney*—Joseph Levinson

[57] ABSTRACT

A hollow cargo bolster, preferably of a truncated pyramid-like shape, is provided for holding cargo in place within the confines of the cargo space. The bolster is constructed of a resilient material which is semi-compressible, has grip, and a low-weight per unit volume, such as expanded polyvinyl chloride. Stop means are provided on the inner surface of the hollow bolster near the top to accommodate stacking and storage.

2 Claims, 2 Drawing Figures

Patented July 25, 1972

3,678,865

INVENTOR.
WALLACE D. VAN ETTEN

BY

ATTORNEY

CARGO BOLSTER

BACKGROUND OF THE INVENTION

A serious problem exists in stabilizing the cargo within the confines of air-freight "Igloos," containerized compartments, compartments of box cars, trucks, or other bodies used as carriers in transportation of various forms of merchandise. If such compartments and containers are not packed properly, any sudden variation in the lateral or vertical movement of the carrier can shift the cargo, resulting in damage thereto. Even when such compartments are fully loaded with all of the space occupied, various shapes and sizes of the individual containers for the cargo may not completely fill, or provide a balanced configuration for the cargo within the compartment, thereby requiring some sort of external support or balancing of weight. One manner of handling the problem is to fill the blank spaces in the compartments with dummy packages or dunnage in the form of bags of loosely packed bulk material. The handling and storage with this type of solution is costly and time consuming. Another manner of handling the problem is to install frames in the compartment to accommodate the shape of the cargo. This solution requires the building of a different frame for each different shipment which in most cases will not be reusable and which must in some form be affixed to the container, which eventually may damage the container itself. Of course ropes, chains, and other means may be utilized, which are still costly from the labor standpoint, and only moderately successful in handling certain types of bulky cargo. There is also the weight problem of the dunnage which is used. This is particularly sensitive in air freight use.

Accordingly, it is an object of this invention to provide a cargo dunnage means in the form of a bolster which is flexible and provides a simple solution to the cargo stabilization problem.

A further object of this invention is to provide a cargo bolster which is light weight, easy to handle, and is less costly from a labor standpoint than other methods of cargo stabilization.

Still a further object of this invention is to provide a cargo bolster which may be readily stored without requiring large storage areas while the units are not in use.

SUMMARY OF THE INVENTION

In carrying out this invention in one illustrative embodiment thereof, a cargo bolster is provided which is hollow, having a base and tapered side structure terminating in a truncated top, with the top being parallel to the base. The bolster is constructed of a resilient, semi-compressible material having grip with other surfaces and a low weight per unit volume. A stop means is also positioned inside the hollow bolster on the tapered side structure near the truncated top to permit stacking when not in use and to accommodate separation when in use.

DESCRIPTION OF THE PREFERRED EMBODIMENT

Figure 1:
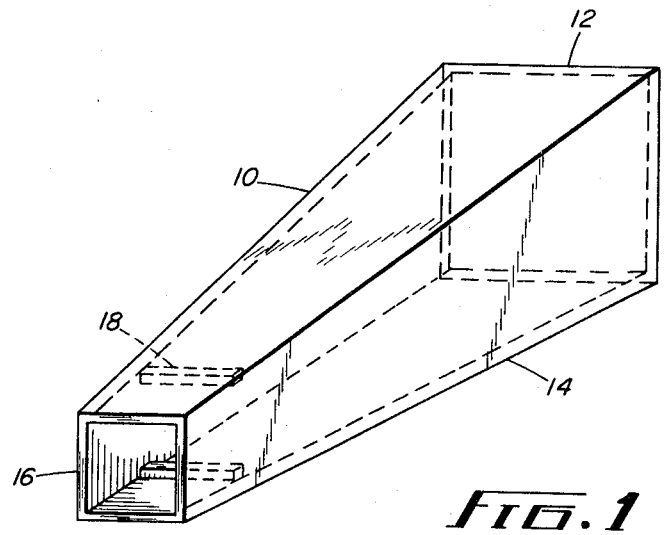
FIG. 1 is an isometric view of one form of the cargo bolster embodied in this invention.

Referring now to FIG. 1, there is shown the cargo bolster 10 of the type embodied in this invention, which is preferably of a pyramidal-like shape with either a square or rectangular shaped base. The bolster 10 is hollow and has a base 12 with tapered side structure 14 terminating in a truncated top 16 which is parallel to the base 12. The percentage of taper of the side structure 14 may vary depending on the requirements of the carrier. A bar or other form of stop means 18 is positioned on the inner side surface 14 near the top 16. The stop means 18 is provided to avoid binding of the units when stacked for storage and provides a means for readily separating the bolsters 10 after they have been stacked and are desired to be removed for use.

The type of material utilized for the bolster 10 is of extreme importance. The material must be somewhat resilient, with strength in compression. It also must hold or grip well when in contact in compression with other surfaces. The surface of the material may be relatively smooth, but better results are produced if the surfaces are textured or scored to give a better grip. It is also desirable that the material have a low weight per unit volume, particularly with respect to air freight use, where weight is an extremely critical factor. One type of material which has been found satisfactory for all these requirements is a product known as Serex, manufactured by Serex, Inc. of Twinsburg, Ohio. Serex is an expanded polyvinyl chloride material varying in weight after manufacture from less than 4.5 lbs. to more than 30 lbs. per cubic foot. The bolster 10 is preferably constructed or expanded closed-cell plastic material as afore noted because it has all the required properties and also because it has great flexibility in weight per unit volume. The thickness and the outer dimension of the unit together with its weight per cubic foot may vary to meet the requirements of the carrier, but in all cases the bolster will be tapered in shape to cause a wedging action when shoved into place in an unoccupied space surrounding cargo. Although the expanded polyvinyl chloride material is preferred, other materials which have similar properties may be utilized.

Figure 2:
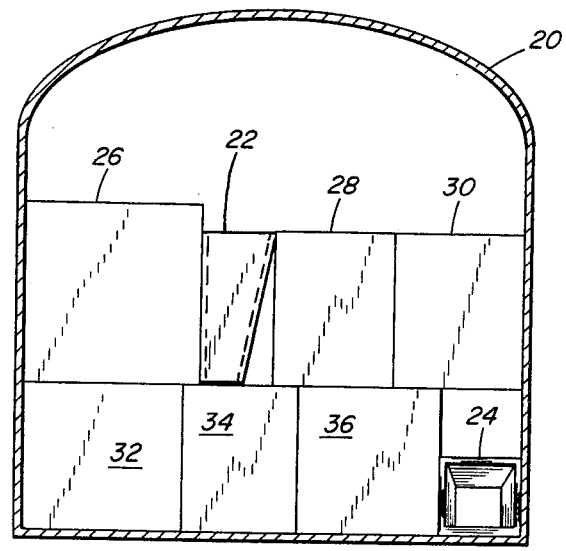
FIG. 2 shows a section through a cargo compartment illustrating the type of use to which the cargo bolsters of FIG. 1 are applicable.

FIG. 2 shows a freight or cargo compartment 20 to illustrate only two of several ways in which the cargo bolster of this invention may be utilized. The cargo compartment 20 has a plurality of boxes 26, 28, 30, 32, 34 and 36 which are housed therein. One bolster 22 is shown wedged vertically between the containers 26 and 28 which will restrict lateral as well as vertical movement in the row of containers 26, 28 and 30. Another bolster 24 is shown aligned in a horizontal plane with the row of containers 32, 34 and 36, with the bolster 24 having its larger base wedged between the wall of the compartment 20 and the container 36. This prevents lateral movement for this row of containers and vertical movement of course is restricted by the upper row of containers and the bolster 22. It will be apparent to those skilled in the art that the number of bolsters used and their particular positioning will depend on the type of cargo containers in use and the amount of space left over after the containers have been loaded. As has been pointed out, different shapes and sizes of the bolsters may be made to accommodate the different types of cargo containers which are to be housed in the cargo compartment. Obviously, the cargo may be irregular in shape as well as square. The bolster units offer the advantage of flexibility in installation, e.g., in-line opposing position, in-line multiple positioning, staggered multiple positioning, etc., to provide for full and snug bolstering action. As has been pointed out previously, to properly perform bolstering function, the bolster provides a certain amount of resiliency, yet offers strength and compression to offset impacts caused by any sudden variation in lateral or vertical movement of the carrier. After use the bolster has sufficient resiliency to return to its original shape to be used again.

Since it has been pointed out that the material of the bolster contains a certain amount of grip, the stop means 18 provides the function of preventing binding of the units when they are stacked for storage. By stacking, much less space is taken in storing the units between uses. Since warehouse space is important in cargo handling facilities, this means of stacking provides a distinct advantage over bulk type dunnage which is difficult to handle and takes up much space.

Another distinct advantage of the bolsters in accordance with this invention is that they may be molded or fabricated. Fabrication would consist of cutting the materials into strips and assembling them.

The pyramid-like shape and tapered side structure with the flat bases provide a wedging action when the bolsters of this invention are shoved into place in the unoccupied spaces of a cargo container. This shape and wedging action permits the bolster use with all types of irregular shaped cargo, and offers a wide variety of placement to provide this action.

Since other modifications, varied to fit particular operating requirements and environments, will be apparent to those skilled in the art, this invention is not considered limited to the examples chosen for purposes of disclosure, and covers all modifications and changes which do not constitute a departure from the true spirit and scope of this invention.

I claim

1. A cargo packing system for holding cargo in place within the confines of a cargo space comprising
   a. a cargo compartment,
   b. packaged cargo comprising rows and columns of containers positioned in said cargo compartment and filling less than and leaving space in said compartment which could cause cargo shifting therein,
   c. a hollow, four-sided, pyramidal shaped bolster having a base and tapered side structure terminating in a truncated top which is parallel to said base,
   d. said bolster constructed of an expanded closed-cell plastic, resilient material which has strength in compression, grip with respect to other surfaces, and a low weight per unit volume,
   e. at least one of said bolsters being wedged in said space left in said compartment, said bolster being subjected to compression by the weight of said containers to provide said wedging action to hold said packaged cargo in place within said cargo compartment.

2. The structure set forth in claim 1 wherein the material for said bolster is expanded polyvinyl chloride.

* * * * *